(12) United States Patent
Wegner

(10) Patent No.: US 7,572,549 B2
(45) Date of Patent: Aug. 11, 2009

(54) PRISMATIC BATTERY MADE OF MULTIPLE INDIVIDUAL CELLS

(75) Inventor: Bernd Wegner, Pforzheim (DE)

(73) Assignee: Daimler AG, Stuttgart (DE)

( * ) Notice: Subject to any disclaimer, the term of this patent is extended or adjusted under 35 U.S.C. 154(b) by 405 days.

(21) Appl. No.: 11/481,289

(22) Filed: Jul. 5, 2006

(65) Prior Publication Data

US 2007/0018610 A1    Jan. 25, 2007

(30) Foreign Application Priority Data

Jul. 6, 2005    (DE) .................... 10 2005 031 504

(51) Int. Cl.
  *H01M 6/46* (2006.01)
(52) U.S. Cl. .................. 429/152; 429/156; 429/149; 429/120; 62/239; 165/43
(58) Field of Classification Search .............. 429/120, 429/149, 152, 156; 62/239; 165/43
See application file for complete search history.

(56) References Cited

U.S. PATENT DOCUMENTS

| 5,756,227 A | 5/1998 | Suzuki et al. ............... 429/62 |
| 6,689,510 B1 | 2/2004 | Gow et al. ................ 429/149 |
| 6,821,671 B2 * | 11/2004 | Hinton et al. ............. 429/120 |

FOREIGN PATENT DOCUMENTS

| EP | 1 117 138 A1 | 7/2001 |
| EP | 1 278 263 A2 | 1/2003 |

* cited by examiner

*Primary Examiner*—Laura S Weiner
(74) *Attorney, Agent, or Firm*—Davidson, Davidson & Kappel

(57) ABSTRACT

A prismatic battery including multiple individual cells, at least two of which are combined to form a prismatic module. At least two of the modules, in turn, are stacked to form the battery and joined together under tension between two end plates. The prismatic battery also has at least one cooling member which is in heat-conducting contact with at least one of the modules. This cooling member has at least one cooling fin which is provided parallel to the direction of the tensioning force.

20 Claims, 6 Drawing Sheets

PRISMATIC BATTERY MADE OF MULTIPLE INDIVIDUAL CELLS

Priority is claimed to German patent application DE 10 2005 031 504.6, filed Jul. 6, 2005, the entire disclosure of which is hereby incorporated by reference herein.

The present invention relates to a prismatic battery made of multiple individual cells, at least two of which are combined to form a prismatic module, at least two of the modules being stacked to form the battery and joined together under tension between two end plates, having at least one cooling member which is in heat-conducting contact with the modules.

BACKGROUND

Batteries, in particular high-performance batteries based on nickel metal hydride or lithium, such as those frequently used in today's applications for driving vehicles, for example electric vehicles or hybrid vehicles, are typically made of stacked prismatic modules. Multiple modules of this type are then combined to form the battery. The individual modules include the electrochemical cells of the battery, multiple cells of this type typically being provided in a single module.

Furthermore, the modules typically have an electric connection at each of their narrow, opposite ends. The stack of individual modules forming the battery is then usually joined under tension via mechanical end plates and tension members to form the battery. In addition to mechanically attaching the modules to each other, the end plates and tension members are used, in particular, to counteract deformation due to gas pressure changes which occur in the electrochemical cells provided in the interior of the modules during operation. High-performance batteries of this type also require cooling to ensure the necessary operating temperature within the battery.

For example, a battery of this type having prismatic modules is known from EP 1 117 138 A1, in which spacers, for example corrugated sheets or the like, are inserted between the individual modules. This produces channels between the individual modules through which a coolant, in particular air, can flow for the purpose of cooling.

In the case of this convection cooling, the outer areas of the individual electrochemical cells located in the modules are cooled to a greater extent than the inner central areas, due to the larger contact area with the coolant. As a result, the electrodes placed on the outer surfaces of the module are cooled to a greater extent than those closer to the inside of the module. In addition, the electric discharge line, which is situated in the area of the outer cells and typically also conducts heat, acts in such a way that the outer module cells are cooled to a greater extent. Finally, the individual modules of a battery of this type are cooled at different rates, since the modules positioned in the area of the end plates also undergo greater cooling than the modules in the middle of the stack, due to the cooler end plates in their direct vicinity.

The uneven cooling of the individual electrochemical cells in the module then results in uneven cell voltages during module operation and in a substantially faster aging of the warmer cells in the center of the module. This aging is expressed in an increase in the internal resistance and a related decrease in the capacitance of the individual cell. However, since the individual electrochemical cells are typically connected in series, the usable overall capacitance of the battery is no greater than the capacitance of the electrochemical cell having the lowest capacitance. The use of the battery, for example in a vehicle, can therefore be limited to a great extent by an aging-related loss in the capacitance of a single cell. The best way to counteract this effect requires highly complex and, in particular, large cooling devices, which are difficult to accommodate in motor vehicles, especially in the small amount of space available.

Furthermore, the use of air as a cooling medium, for example in the aforementioned EP publication, has the disadvantage that high-volume air channels, air filters, and fans are needed to conduct the quantity of air needed for cooling. It is further problematic to implement an air cooling system, since the input temperature of the air used should not be excessively high for effective cooling. For use in a vehicle, this means, in particular, that the battery cooling is dependent on the conditions of the cooling air. For example, battery cooling is not as efficient at extremely high ambient temperatures as it is at much lower ambient temperatures.

An alternative to the cooling method explained above is described in U.S. Pat. No. 5,756,227. In this case, conduction cooling is practiced instead of convection cooling for primary heat removal. For this purpose, cooling fins are integrated between the individual modules. These cooling fins terminate in a common base element, which, in turn, is cooled by convection. This convection can be implemented, for example, by air or by cooling lines having a liquid cooling medium.

A problem with the design according to the aforementioned US publication is that uniform mechanical joining of the stack of modules under tension is no longer possible, due to the rigid cooling fins. When gas pressure builds up in the individual cells, the outer housing walls of the modules therefore begin to bulge. As a result, air gaps, which result in loss of thermal contact between the module and cooling fins, form between the module and cooling fin, due to the module deformation caused by the pressure rising therein. This means that uniform cooling can also not be ensured. Once again, this results in the aforementioned disadvantages of poor and, in particular, uneven cooling of the individual module cells.

To avoid the aforementioned problem, EP 1 278 263 A2 describes a structure of a prismatic battery in which metallic cooling fins are integrated into the material of the modules.

The aforementioned structure at least attempts to avoid the aforementioned problems resulting from the loss of contact between the cells and cooling fins. However, it has the disadvantage that achieving sufficient stability in a material structure of this type having integrated metal plates requires very thick materials. However, these very thick materials, which are typically made of plastic material forming the casing of the metal plates, have the disadvantage that they are poor heat conductors.

Furthermore, in the case of the integrated metal plates according to the aforementioned EP publication, the thermal coupling of the metal plates to the cooled base plate is extremely difficult. The position of the heat-removing contacts of the integrated metal plate on the base plate changes during battery operation, depending on the gas pressure in the individual modules as well as the elasticity of the tension members connecting the individual modules to the stack via the end plates. The heat-removing contacts of the integrated metal plates must therefore be able to slide on the cooled base plate. This function alone, which is necessary as a result of the unavoidable, pressure-related expansion in the battery stack, makes it clear that maintaining clean and uninterruptible conduction of heat from the integrated metal plates to the base plate for all phases of operation will be very difficult.

A further disadvantage is certainly the fact that constructing the modules from different materials having varying coefficients of thermal expansion is critical. Modules of this type also frequently undergo highly dynamic temperature fluctuations in the range of 20 K to 100 K. Due to the different expansion coefficients of the integrated metal plates, compared to the module material, which is typically made of plastic, the plastic easily peels off the integrated metal plates. Even this construction therefore results in air gaps which substantially impair thermal conductivity and also significantly reduce the mechanical stability of such modules, which is important due to the pressure fluctuations.

SUMMARY OF THE INVENTION

An object of the present invention is to improve a prismatic battery in such a way that a simple, compact, and cost-effective battery structure is made possible.

The present invention provides a prismatic battery with a cooling member for a stack of prismatic modules, which are connected under tension in the direction of the stack via end plates and tension members to form the battery. The cooling fins of the cooling member according to the present invention run parallel to the direction of this tensioning pull. The heat thus flows from the individual electrochemical cells toward the cooling fins of the cooling member largely perpendicularly to the direction of tensioning pull. An expansion of the individual modules due to pressures produced therein thus has no effect on the contact between the individual modules and the cooling fins, since the latter are situated along the primary direction of module expansion. Furthermore, this allows the module stack to slide in the direction of the end plates as a result of a change in gas pressure within the modules, without the contact between the cooling fins or the cooling capacity being impaired thereby.

This provides the battery according to the present invention with a particularly simple and compact design having efficient cooling, so that it is especially suitable, for example, for the preferred application as a traction battery in a vehicle.

In an advantageous embodiment of the battery according to the present invention, each of the prismatic modules also has slot-shaped recesses situated in particular between the individual cells and running in the direction of the tensioning force, the cooling fins being provided in these recesses when the battery is mounted.

This achieves even and efficient cooling of the individual module cells by the cooling member, regardless of their position in the module, and of the individual modules, regardless of their position in the stack. In particular, if the slots are situated between the individual cells, and the cooling fins are provided in the slots, the electrode stack present in each electrochemical cell is able to be evenly cooled along the highly conductive metallic electrode films over the entire height of the electrode stack, since heat does not have to flow in the direction of the stack, but rather the heat may be removed perpendicularly to the individual electrode films on the cooling fins. In a construction of this type, both the individual electrochemical cells in the modules and the modules themselves are already fixed in place by the cooling fins in a horizontal direction transverse to the stack tensioning and may be protected by the cooling member against mechanical damage, for example from their bottoms or, if multiple cooling members are used which engage with the modules from above and below, from both sides.

BRIEF DESCRIPTION OF THE DRAWINGS

Further embodiments of the present invention can be derived from the the exemplary embodiment illustrated below, which is explained in greater detail on the basis of the drawing.

DETAILED DESCRIPTION

Figure 1:
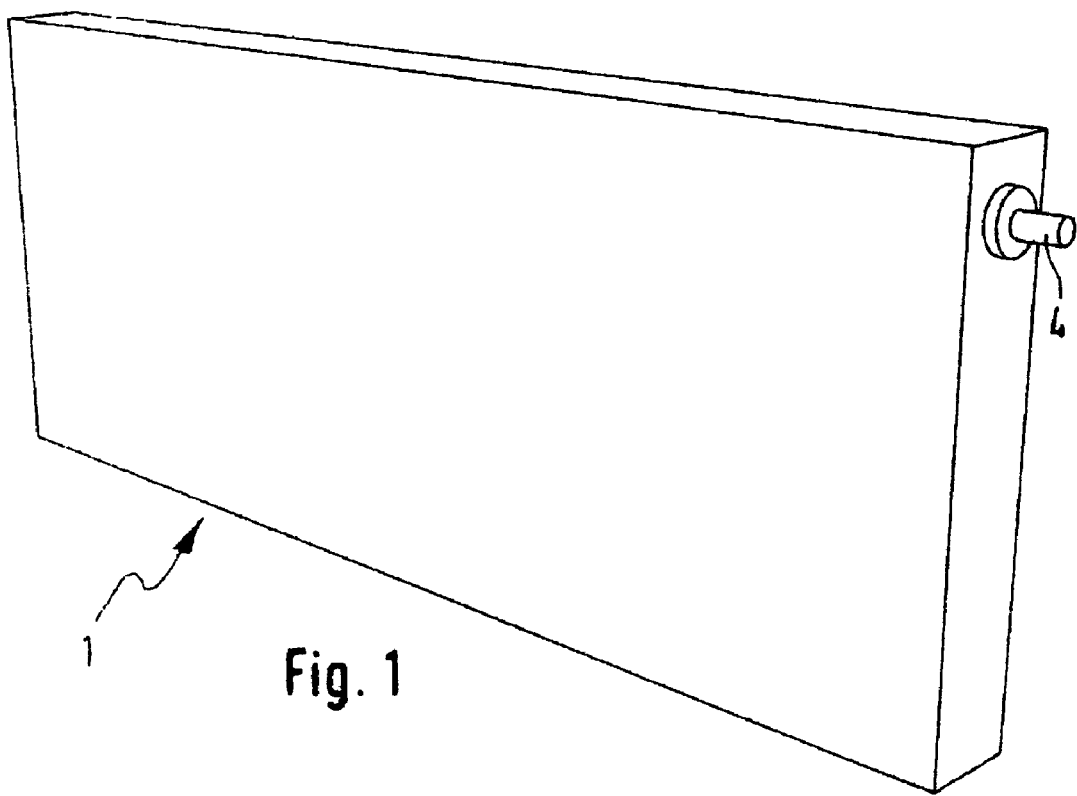
FIG. 1 shows a single prismatic module of a battery.

FIG. 1 shows a single module 1 of a battery 2, which is illustrated in its entirety later on. This module 1 is typically made up of multiple individual electrochemical cells 3, which are situated inside module 1 and are not visible in the representation selected here. Module 1 also includes two electric connections 4, one of which is illustrated here.

Figure 2:
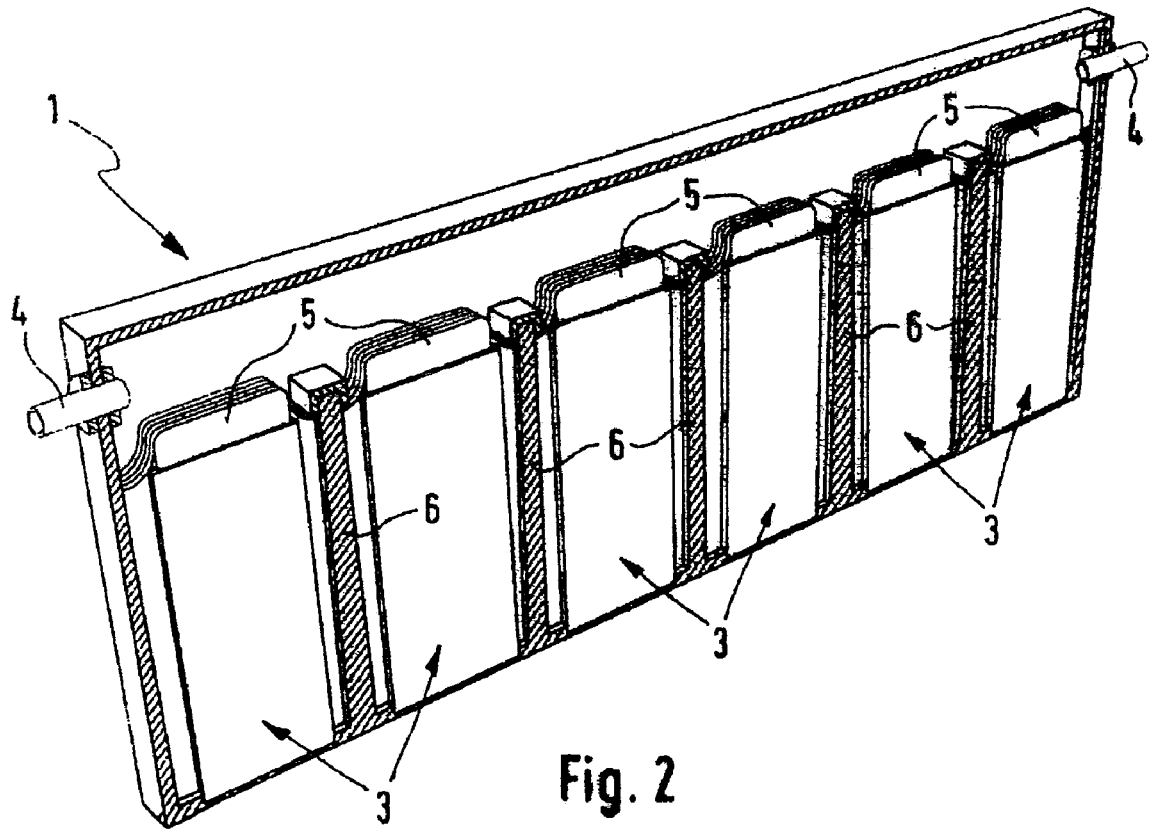
FIG. 2 shows a cross section of a single prismatic module of a battery according to the related art.

FIG. 2 shows a sectional view of a module 1 of this type in an embodiment according to the related art. In addition to the two electric connections 4, this illustration also shows individual electrochemical cells 3 inside module 1. Individual electrochemical cells 3 each include alternating vertically stacked electrodes which are typically designed as metal plates or metal films, and an active ground and electrolyte positioned therebetween. A number of these films serving as electrodes are shown schematically in FIG. 2 and are identified by reference numeral 5.

Module 1 illustrated here has 6 electrochemical cells 3 of this type. Individual cells 3 are separated from each other by cell connectors 6. Individual cells 3 are electrically contacted with each other by contact elements which interconnect individual cells 3 over these cell connectors 6. In principle, any other structure of module 1 is also conceivable, for example a structure in which such connectors between the individual cells project inward, and in which contacting may occur through openings remaining between the two cell connectors. A structure of this type may provide the advantage that the housing of module 1 may include two parts having an identical design which are then simply stacked on top of each other. The length of the resistive current path through the module may also be shortened thereby. This reduces the module resistance and heat development at this location.

Figure 3:
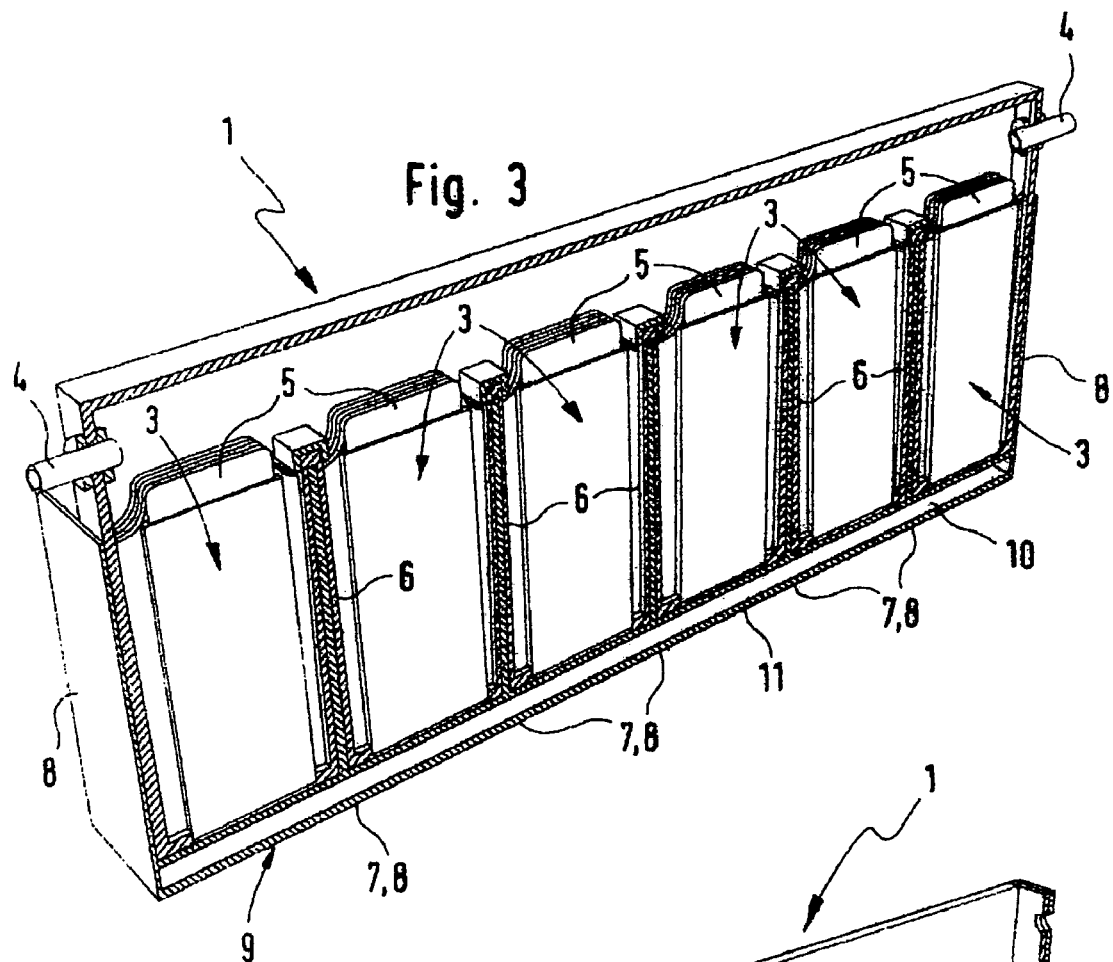
FIG. 3 shows a cross section of a single prismatic module of a battery according to the present invention.

FIG. 3 shows the same module 1, but in an embodiment according to the present invention. Module 1 has largely the same structure as described above in FIG. 2. In addition to the structure described above, cell connectors 6 of module 1 have recesses 7. These recesses 7 in cell connectors 6 run through module 1 as slots, each positioned transversely to the direction of the length of electrodes 5. In the embodiments of module 1 illustrated here, these recesses 7 are filled with cooling fins 8 of a cooling member 9. Cooling fins 8 connected to central cooling member 9 therefore extend into recesses 7 of cell connectors 6. This enables them to remove the heat from the side edges of individual cells 3, through cell connectors 6, and thus directly from all their electrodes 5. Fluid or gaseous cooling medium, for example, may then flow through cooling member 9 in an opening 10, indicated here by way of example, in the form of a cooling channel, so that the heat conducted away from individual cells 3 via cooling fins 8 may be removed by the cooling member.

Figure 4:
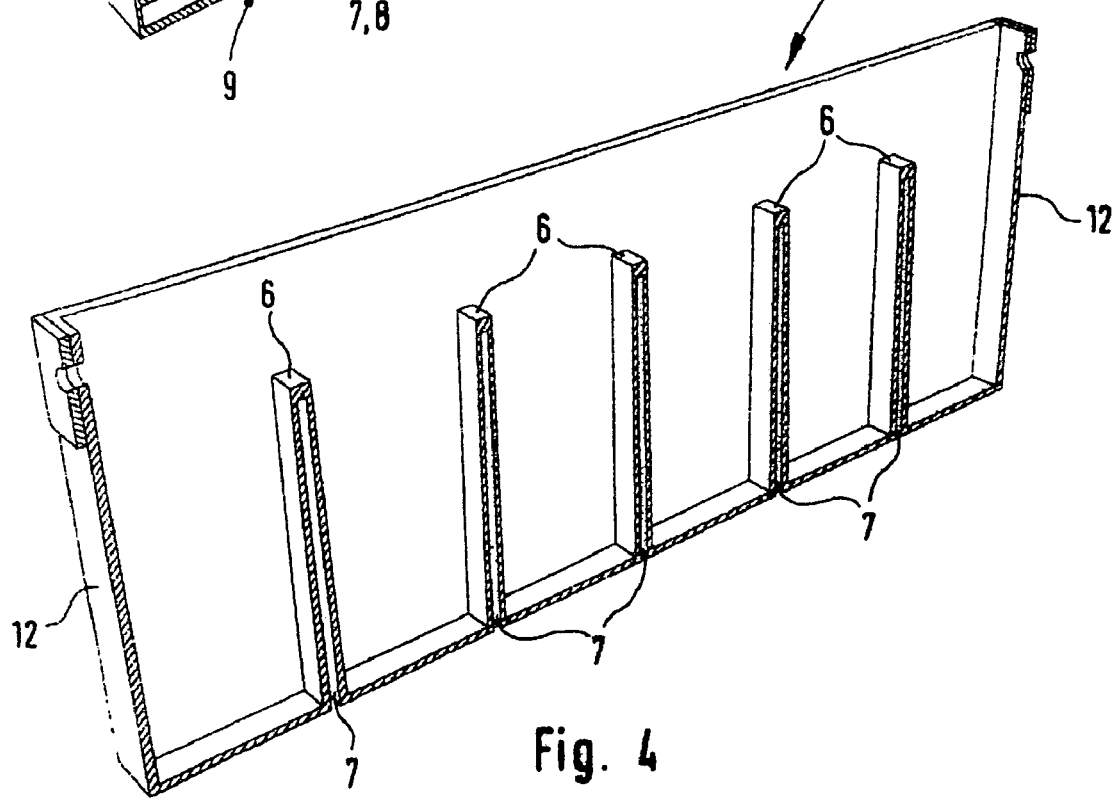
FIG. 4 shows a cross section of part of the module according to the present invention, without the electrochemical cells.

This structure is once again shown more clearly in the following illustrations in FIG. 4 and FIG. 5 in the disassembled state. FIG. 4 again shows the cross section of module 1, only the housing of module 1, without electrochemical cells 3, electric contacting and electric connections 4, being illustrated. It is clear that, in each of cell connectors 6, a recess 7 is provided, with which cooling fins 8 of the section of cooling member 9 illustrated in FIG. 5 will engage later on after battery 2 has been assembled.

Figure 5:
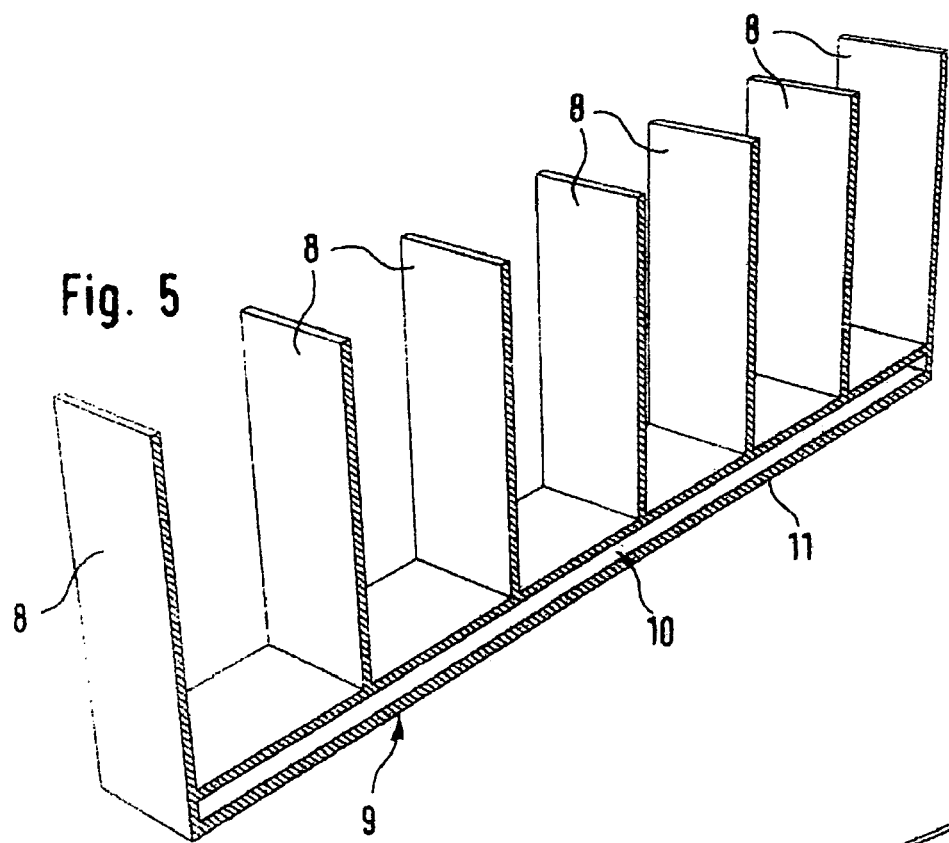
FIG. 5 shows a cross section of part of the cooling member according to the present invention.

Cooling member 9 itself, of which only a section is illustrated in FIG. 5, largely includes a base element 11 having opening 10 situated therein to cool cooling member 9. Individual cooling fins 8 are then mounted on this base element 11. In their greatest dimension, cooling fins 8 are oriented transversely to the direction of the greatest dimension of module 1 and are inserted into recesses 7 of module 1. To manufacture modules 1 in the preferred manner using casting techniques, and enable cooling fins 8 to be easily accommodated when battery 2 is assembled, both cooling fins 8 and recesses 7 have a tapered design in at least one direction. In particular, the preferred direction in which cooling fins 8 taper is designed so that they taper, starting from base element 11, in the direction of the side facing away from this base element 11. In one embodiment of recesses 7, individual modules 1 may be easily mounted on cooling fins 8 of cooling member 9. They are thus pressed against cooling member 9 by the force of gravity without any additional action being necessary. This enables secure contacting to be implemented over a large surface area between the walls of recess 7 and cooling fins 8.

Figure 6:
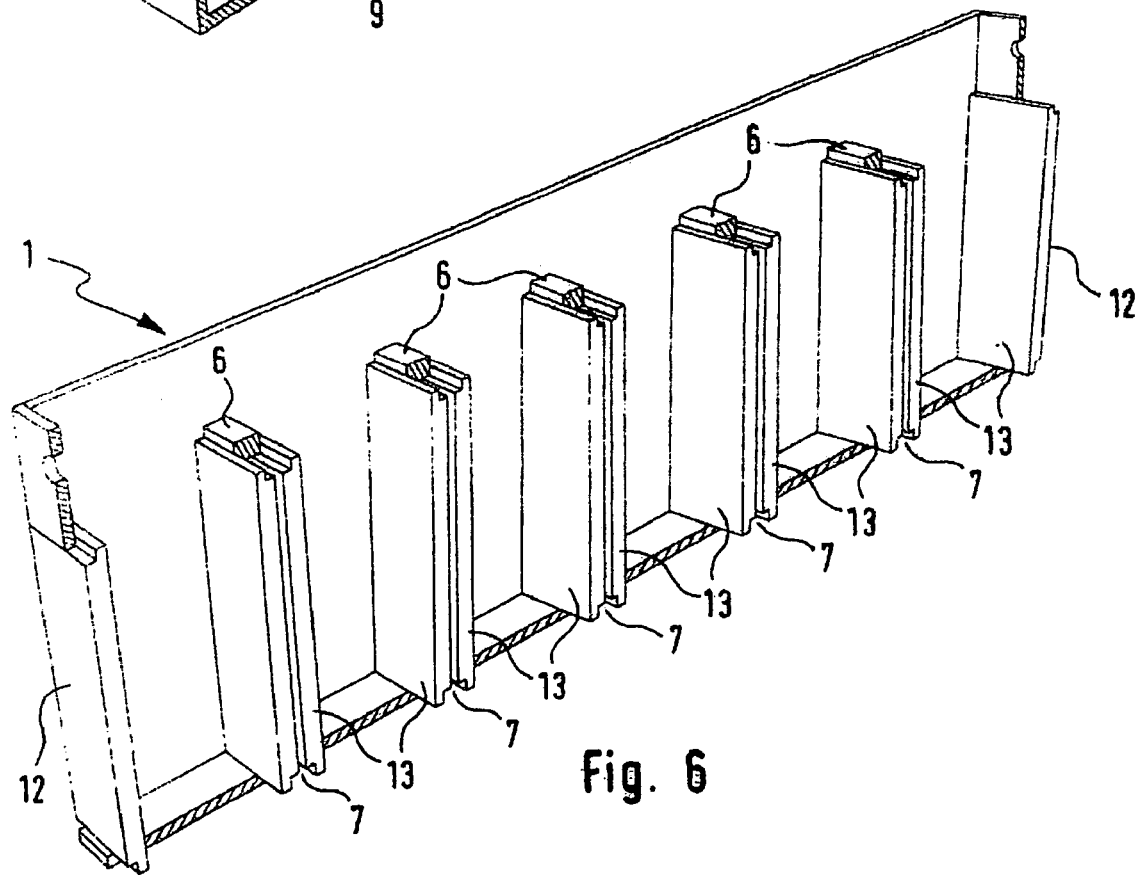
FIG. 6 shows a cross section of an alternative embodiment of the module according to the present invention.

FIG. 6 shows an alternative embodiment of the housing of module 1. Instead of cell connectors 6 provided with recesses 7, which have always been manufactured as one piece with the housing of module 1 of a single material such as a plastic material, the walls of recesses 7 as well as side surfaces 12 of module 1, which are in contact with one of cooling fins 8, are each made of a ceramic material. These ceramic inserts 13 may be inserted into the injection molds during manufacture of the housing of module 1 in such a way that a positive contact is established between ceramic inserts 13 and the rest of the housing. Ceramic inserts 13 are not completely encased by the material of the remaining housing, but only in the edge region. In a housing of module 1 constructed in this manner, ceramic inserts 13 establish the contact between cooling fins 8 introduced between them and electrochemical cells 3, which are not illustrated here. Since ceramic material has a thermal conductivity that is higher than that of a plastic by a factor of 80 to 100, while providing electric insulating properties, constructing module 1 is this manner may further improve the transfer of heat from electrochemical cells 3 of module 1 to cooling fins 8 and thus to cooling member 9.

Figure 7:
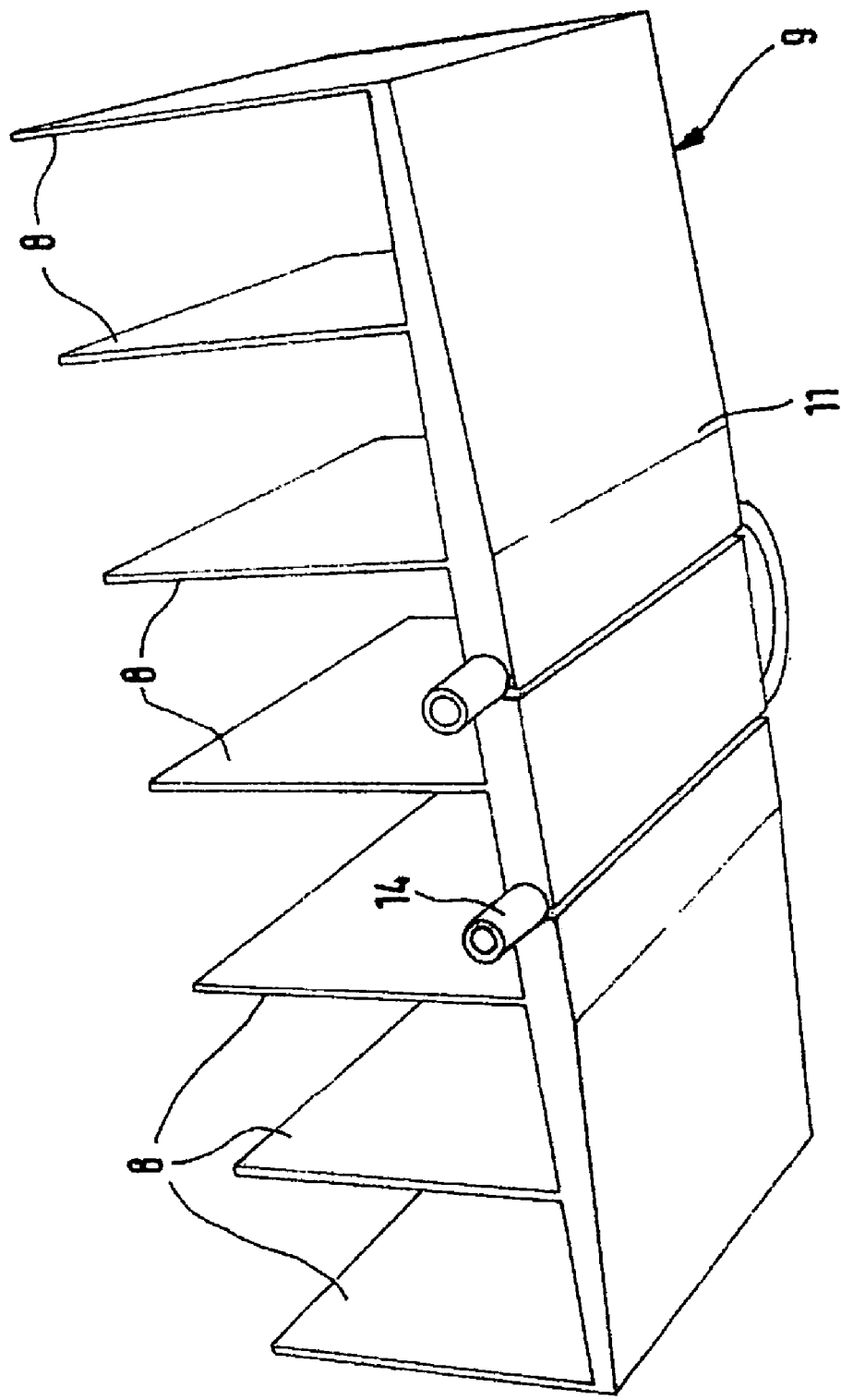
FIG. 7 shows an alternative embodiment of the cooling member according to the present invention.

FIG. 7 shows a typical embodiment of a cooling member 9, which in the example illustrated here extends from below into modules 1 or recesses 7 in modules 1. As mentioned above, in an appropriate construction of modules 1, multiple cooling members 9 of this type are also conceivable, for example one from below and one from above.

Cooling member 9 illustrated here not only has cooling fins 8 described above, but also a special embodiment of its base element 11. Base element 11 is designed so that it is thicker in the area of centrally located cells 3 of modules 1. This thickness variation in the direction of the greatest dimension of modules 1 makes it possible to remove different quantities of heat accumulating at individual electrochemical cells 3 of the module. According to the exemplary embodiment shown in FIG. 7, base element 11 of cooling member 9 is thicker in the middle. As mentioned earlier, middle cells 3 of module 1 are typically cooled less efficiently than cells 3 located in the edge region of module 1. This is attributable, among other things, to the lack of heat-producing neighboring cells and to the removal of heat by the electric connections. However, in the area of base element 11, where the latter is thicker, more heat is removed than in its thinner areas. Varying the thickness of base element 11 thus enables heat to be removed more evenly from the area of individual cells 3 of modules 1.

FIG. 7 also shows a pipe 14 as the cooling channel, which replaces opening 10 illustrated in the preceding figures in the area of base element 11 of cooling member 9. For example, the circuit of a fluid cooling medium or a cooling medium based on a two-phase mixture may be connected to this duct 14, this cooling medium actively cooling cooling member 9 and ultimately battery 2.

If a battery 2 of this type is used in the preferred manner in a motor vehicle, line 14 may be connected, for example, to a vehicle air conditioner to actively cool cooling member 9. In this case, the decompressed coolant of the air conditioner flows through cooling member 9, or line 14 connected thereto. This makes it possible to always achieve adequate cooling of battery 2 via cooling member 9, independently of the ambient temperature or the motor vehicle operating state, when the air conditioner is running. Due to externally tapering base element 11 and the active cooling via line 14 located centrally in the thickest region thereof, it is also possible to ensure very even cooling of the entire battery via cooling member 9 and its cooling fins 8.

Figure 8:
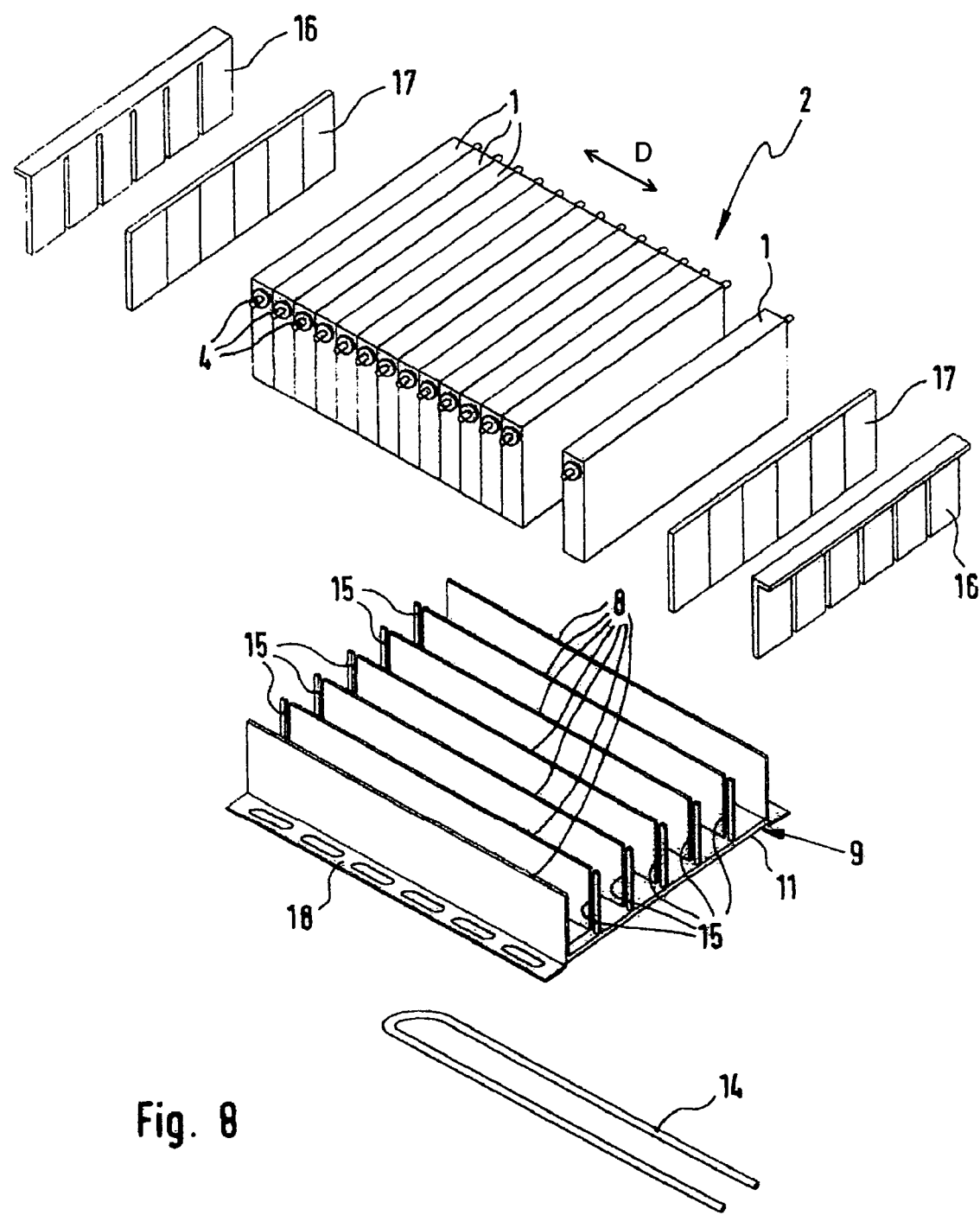
FIG. 8 shows an exploded view of an exemplary embodiment of the battery according to the present invention.

FIG. 8 shows the structure of an entire battery 2 in an exploded view. In the illustration, battery 2 includes a plurality of modules 1, which are joined into a stack. The individual modules have aforementioned recesses 7, which are not clearly shown in FIG. 8. The modules are combined to form a stack and mounted on cooling fins 8 of cooling member 9. Individual cooling fins 8 of cooling member 9 thus run transversely to the length of individual modules 1, through recesses 7 and into modules 1.

To eliminate the tension members usually required when constructing a battery of this type, cooling fins 8 or cooling member 9 may be simultaneously used to mechanically stabilize the battery. In the exemplary embodiment illustrated here, slots 15 are introduced into the ends of cooling fins 8. Individual modules 1 are mounted on cooling fins 8 as a stack and joined together under tension. They are then held together under tension by end plates 16 inserted into slots 15. Cooling fins 8 and/or base element 11 of cooling member 9 are then used as tension members through which the stack of modules 1 is held together under tension in a tensioning force direction D.

To avoid excessive cooling of the two modules 1 facing the two end plates 16, and to ensure that cooling takes place only via cooling fins 8, heat-insulating plates 17 are introduced between end plates 16 and modules 1. This ensures uniform cooling of all modules 1 by cooling fins 8.

In addition to the embodiment illustrated here for clamping modules 1 under tension by end plates 16 mounted in slots 15, other variants are also conceivable for attaching end plates 16 to cooling fins 8 and/or base element 11 used as tension members. This may be, for example, other positive and non-positive connections, tightening straps, screws, and the like. In principle, all means which ensure that the end plates are held under tension against the stack of modules 1 by cooling fins 8 and/or base element 11 are conceivable.

FIG. 8 also shows disassembled line 14, which in the preferred exemplary embodiment of battery 2 illustrated here in the form of a traction battery in a vehicle is connected to the vehicle air conditioner and has decompressed coolant flowing through it for cooling purposes.

Figure 9:
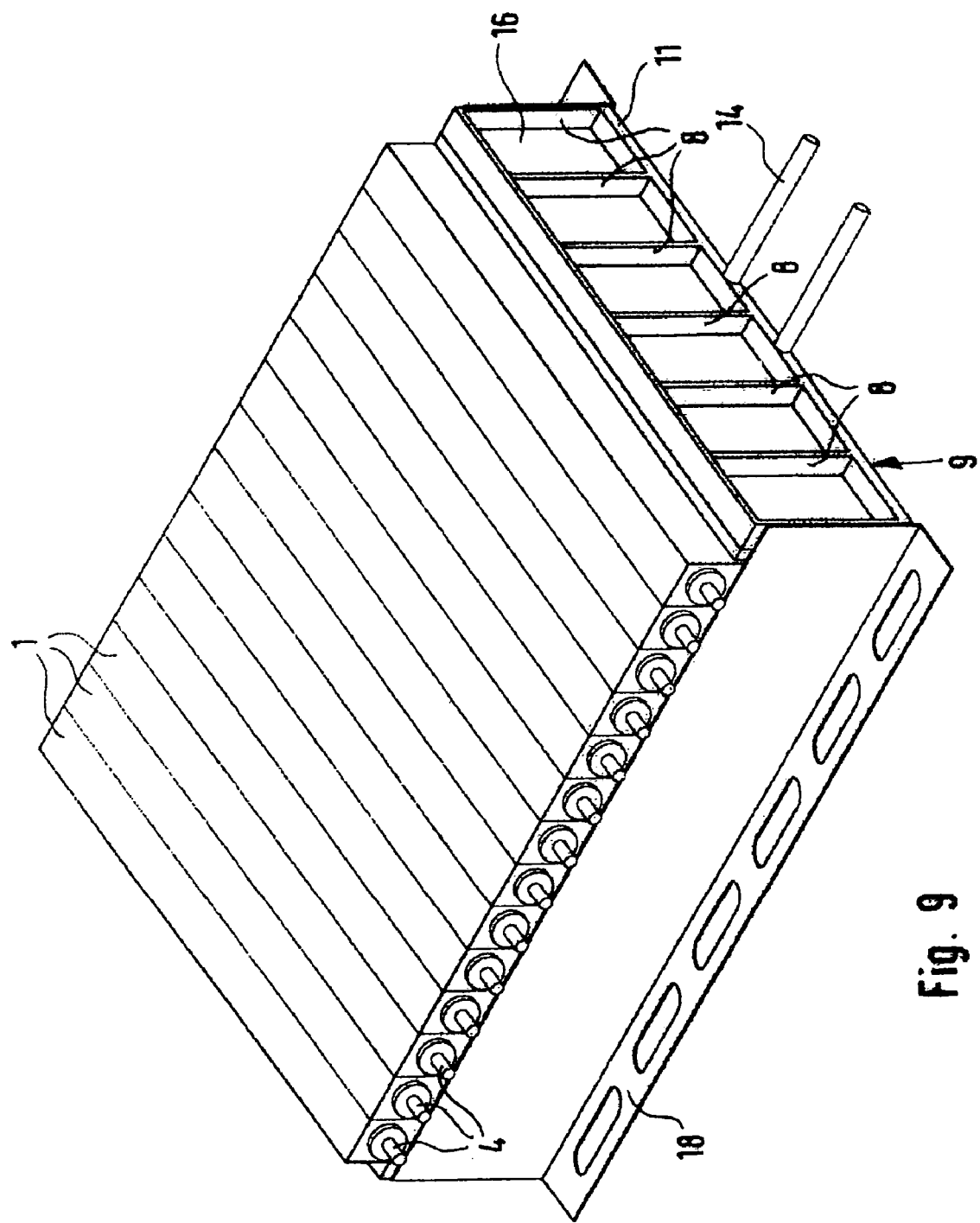
FIG. 9 show the battery according to the present invention illustrated in FIG. 8 in the assembled state.

Finally, FIG. 9 shows the same structure in the assembled state. The embodiment of the battery described above enables the battery to be cooled evenly and efficiently across all modules 1 and all electrochemical cells 3. In addition, the mechanical construction is extremely small and compact. Cooling member 9 may be designed in its entirety as a mechanical receptacle and/or part of the housing of battery 2. In the illustration according to FIG. 9, for example, cooling member 9 forms the lower part of the battery housing, which may then be screwed, for example, into a bracket or to a vehicle body via retaining clips 18.

What is claimed is:

1. A prismatic battery comprising:
   at least two prismatic modules being stacked and joined together under a tensioning force between two end plates, each of the prismatic modules including at least two individual cells,
   at least one cooling member in heat-conducting contact with the modules, the cooling member having at least one cooling fin provided parallel to a direction of the tensioning force.

2. The prismatic battery as recited in claim 1 wherein the cooling member includes a planar base element supporting the at least one cooling fin.

3. The prismatic battery as recited in claim 2 wherein the at least one cooling fin includes a plurality of cooling fins tapered in a direction of ends facing away from the base element.

4. The prismatic battery as recited in claim 2 wherein the cooling member includes at least one cooling channel in an area of the base element, the at least one cooling channel being in thermal contact with the at least one cooling fin.

5. A vehicle air conditioner comprising the prismatic battery as recited in claim 4 and a working medium, the working medium flowing through the cooling channels in the base element of the cooling member.

6. The prismatic battery as recited in claim 2 wherein the base element of the cooling member has a thickness varying laterally to the direction of the tensioning force.

7. The prismatic battery as recited in claim 6 wherein the base element of the cooling member has a greater thickness in the middle laterally to the direction of the tensioning force than it does at edges.

8. The prismatic battery as recited in claim 1 wherein each of the prismatic modules has slot-shaped recesses positioned between the individual cells and running in the direction of the tensioning force, the at least one cooling fin including a plurality of cooling fins provided in the slot-shaped recesses.

9. The prismatic battery as recited in claim 8 wherein the recesses are tapered in a direction perpendicular to the direction of the tensioning force.

10. The prismatic battery as recited in claim 8 wherein the recesses have, at least in part, a ceramic material in an area of walls of the recesses.

11. The prismatic battery as recited in claim 1 wherein the at least one cooling fin includes a plurality of cooling fins connectable to the end plates so that the end plates exert a force on one another.

12. The prismatic battery as recited in claim 1 wherein the cooling member is subject to active cooling.

13. The prismatic battery as recited in claim 1 wherein the at least one cooling member includes at least two cooling members.

14. A traction battery in a vehicle comprising the prismatic battery as recited in claim 1.

15. The traction battery as recited in claim 14 wherein the traction battery is a vehicle hybrid drive traction battery.

16. A prismatic battery comprising:
    a plurality of prismatic modules stacked and joined together under a tensioning force between two end plates, each of the prismatic modules including a plurality of individual cells aligned side-by-side in a longitudinal direction of the respective prismatic module,
    at least one cooling member in heat-conducting contact with the prismatic modules, the cooling member having at least one cooling fin positioned between two of the individual cells of at least one of the prismatic modules and arranged transversely with respect to the longitudinal direction of the respective at least one of the prismatic modules.

17. The prismatic battery as recited in claim 16 further comprising cell connectors between individual cells in each of the prismatic modules, each cell connector including a recess.

18. The prismatic battery as recited in claim 17 wherein the at least one cooling fin includes a plurality of cooling fins and each of the cooling fins is positioned in at least one of the recesses.

19. The prismatic battery as recited in claim 16 wherein each individual cell includes a plurality of stacked electrodes and the at least one cooling fin is positioned transversely to a direction of a length of the electrodes.

20. The prismatic battery as recited in claim 16 wherein the at least one cooling fin includes a plurality of cooling fins and each of the cooling fins is in thermal contact with each of the plurality of prismatic modules.

* * * * *